United States Patent
Chuong

(10) Patent No.: US 10,961,860 B2
(45) Date of Patent: Mar. 30, 2021

(54) NON-CONTACT SEAL WITH REMOVAL FEATURES

(71) Applicant: United Technologies Corporation, Farmington, CT (US)

(72) Inventor: Conway Chuong, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 749 days.

(21) Appl. No.: 15/236,786

(22) Filed: Aug. 15, 2016

(65) Prior Publication Data

US 2018/0045066 A1 Feb. 15, 2018

(51) Int. Cl.
| | |
|---|---|
| *F01D 11/02* | (2006.01) |
| *F16J 15/44* | (2006.01) |
| *F16J 15/3268* | (2016.01) |
| *F04D 29/12* | (2006.01) |
| *F16J 15/447* | (2006.01) |

(52) U.S. Cl.
CPC .......... *F01D 11/025* (2013.01); *F04D 29/122* (2013.01); *F16J 15/3268* (2013.01); *F16J 15/442* (2013.01); *F16J 15/4474* (2013.01); *F16J 15/4478* (2013.01); *F05D 2220/323* (2013.01); *F05D 2230/60* (2013.01); *F05D 2230/70* (2013.01); *F05D 2240/55* (2013.01); *F05D 2240/56* (2013.01); *F05D 2240/59* (2013.01); *F05D 2240/60* (2013.01)

(58) Field of Classification Search
CPC ........ F01D 11/025; F01D 11/02; F04D 29/10; F04D 29/102; F04D 29/12; F04D 29/122; F05D 2240/55; F05D 2240/59; F05D 2240/56; F05D 2220/323; F05D 2240/60; F05D 2230/60; F05D 2230/70; F16J 15/44; F16J 15/442; F16J 15/4474; F16J 15/4478; F16J 15/3268; F16J 15/445
USPC ............ 415/171.1, 229, 230, 231; 416/174; 277/355, 409, 411, 421, 511, 577, 609, 277/630, 637
See application file for complete search history.

(56) References Cited

U.S. PATENT DOCUMENTS

| | | | | |
|---|---|---|---|---|
| 4,121,532 A | * | 10/1978 | Coryell, III | ............ B63H 23/32 440/83 |
| 6,226,975 B1 | | 5/2001 | Ingistov | |
| 7,182,345 B2 | | 2/2007 | Justak | |

(Continued)

FOREIGN PATENT DOCUMENTS

| | | |
|---|---|---|
| CA | 2403664 | 7/2007 |
| CA | 2536362 | 2/2013 |

(Continued)

OTHER PUBLICATIONS

EP search report for EP17175782.6 dated May 2, 2018.
EP search report for EP19188715.7 dated Oct. 29, 2019.

*Primary Examiner* — Christopher Verdier
(74) *Attorney, Agent, or Firm* — Getz Balich LLC

(57) ABSTRACT

An assembly includes a plurality of seal shoes arranged about an axial centerline in an annular array. The assembly also includes a seal base and a plurality of spring elements. The seal base circumscribes the annular array of the seal shoes. A threaded base aperture extends axially through the seal base. Each of the spring elements is radially between and connects a respective one of the seal shoes with the seal base. The spring elements are formed integral with the seal base and the seal shoes as a unitary body.

19 Claims, 11 Drawing Sheets

(56) References Cited

U.S. PATENT DOCUMENTS

| | | | | |
|---|---|---|---|---|
| 8,172,232 B2* | 5/2012 | Justak | ............. | F16J 15/442 |
| | | | | 277/411 |
| 8,641,045 B2* | 2/2014 | Justak | ............. | F16J 15/442 |
| | | | | 277/412 |
| 8,919,781 B2* | 12/2014 | Justak | ............. | F01D 11/025 |
| | | | | 277/411 |
| 9,316,316 B2* | 4/2016 | Kuroki | ............. | F16J 15/442 |
| 10,066,496 B2* | 9/2018 | Schmitz | ............. | F01D 1/04 |
| 10,082,039 B2* | 9/2018 | Hanson | ............. | F16J 15/447 |
| 10,100,657 B2* | 10/2018 | Chuong | ............. | F01D 25/24 |
| 2006/0108188 A1* | 5/2006 | Baumann | ............. | F16D 69/0408 |
| | | | | 188/250 G |
| 2007/0065276 A1 | 3/2007 | Muller | | |
| 2007/0120327 A1 | 5/2007 | Justak | | |
| 2014/0054862 A1* | 2/2014 | Davis | ............. | F01D 11/025 |
| | | | | 277/370 |
| 2016/0097294 A1 | 4/2016 | Wilson | | |
| 2016/0102570 A1* | 4/2016 | Wilson | ............. | F01D 11/02 |
| | | | | 277/411 |
| 2016/0109025 A1* | 4/2016 | McCaffrey | ............. | F01D 11/025 |
| | | | | 277/411 |

FOREIGN PATENT DOCUMENTS

| | | | | |
|---|---|---|---|---|
| CA | 2675597 | | 5/2015 | |
| EP | 2279364 | | 5/2009 | |
| EP | 2665897 | | 11/2013 | |
| EP | 2137383 | | 12/2013 | |
| WO | 2014150825 | | 9/2014 | |
| WO | WO-2014143284 A1 * | 9/2014 | ............. | F01D 19/00 |

* cited by examiner

NON-CONTACT SEAL WITH REMOVAL FEATURES

This invention was made with government support under Contract No. FA8650-09-D-2923-0021 awarded by the United States Air Force. The government may have certain rights in the invention.

BACKGROUND OF THE INVENTION

1. Technical Field

This disclosure relates generally to rotational equipment and, more particularly, to a non-contact seal assembly for rotational equipment.

2. Background Information

Various hydrostatic non-contact seal assemblies are known in the art. While these seal assemblies have various benefits, there is still room in the art for improvement.

SUMMARY OF THE DISCLOSURE

According to an aspect of the present disclosure, an assembly is provided with an axial centerline. This assembly includes a plurality of seal shoes, a seal base and a plurality of spring elements. The seal shoes are arranged about the centerline in an annular array. The seal base circumscribes the annular array of the seal shoes. A threaded base aperture extends axially through the seal base. Each of the spring elements is radially between and connects a respective one of the seal shoes with the seal base. The spring elements are fainted integral with the seal base and the seal shoes as a unitary body.

According to another aspect of the present disclosure, another assembly is provided with an axial centerline. This assembly includes a static structure, a rotor structure, a carrier structure and a seal assembly. The carrier structure extends axially along and circumferentially around the centerline. The carrier structure is nested radially within and radially engaging the carrier structure. The seal assembly is configured to substantially seal an annular gap between the static structure and the rotor structure. The seal assembly includes a hydrostatic non-contact seal device nested radially within the carrier structure. The hydrostatic non-contact seal device includes a seal base. A plurality of threaded base apertures are arranged about the centerline in an annular array. Each of the threaded base apertures extends axially through the seal base.

According to still another aspect of the present disclosure, a method is provided involving a piece of rotational equipment with an axial centerline. This method includes steps of: (I) mating a threaded shaft with a threaded base aperture, wherein a tool comprises the threaded shaft, the threaded base aperture is configured in a seal base of a hydrostatic non-contact seal device, and the hydrostatic non-contact seal device is mounted within the piece of rotational equipment; and (II) using the tool, where the threaded shaft is mated with the threaded base aperture, to remove the hydrostatic non-contact seal device from the piece of rotational equipment.

The method may include a step of using the tool, where the threaded shaft is mated with the threaded base aperture, to remove a secondary seal device from a carrier structure. The seal base may be nested radially within and radially engaged with the carrier structure during the removal of the secondary seal device from the carrier structure.

The method may include steps of: mating the threaded shaft with a second threaded base aperture, wherein the second threaded base aperture is configured in the seal base; and using the tool, where the threaded shaft is mated with the second threaded base aperture, to remove the seal base from a carrier structure by pushing against the carrier structure with the tool. The seal base may be nested radially within and radially engaged with the carrier structure during the removal of the seal base from the carrier structure.

The threaded base aperture may be one of a plurality of threaded base apertures arranged about the centerline in an annular array. Each of the threaded base apertures may extend axially through the seal base.

The assembly may include a support ring including a surface that axially engages the seal base. A ring aperture may extend axially through the support ring. The ring aperture may be aligned with a first of the threaded base apertures. A second of the threaded base apertures may be closed off by the surface.

The ring aperture may be configured as or otherwise include a threaded ring aperture.

The assembly may include a support ring including a surface that axially engages the seal base. A plurality of ring apertures may be arranged about the centerline in an annular array. Each of the ring apertures may extend axially through the support ring and may be aligned with a respective one of the threaded base apertures. A number of the threaded base apertures may be greater than a number of the ring apertures.

Each of the ring apertures may be configured as or otherwise include a threaded ring aperture.

The assembly may include a support ring including a surface that axially engages the seal base. A ring aperture may extend axially through the support ring. The ring aperture may be aligned with the threaded base aperture.

The assembly may include a carrier base extending axially along and circumferentially around the centerline. The seal base may be nested radially within and radially engage the carrier base.

The support ring may be configured with the carrier base in a monolithic body.

The assembly may include a secondary seal carrier ring nested radially within the carrier base. The assembly may also include at least one secondary seal device configured with the secondary seal carrier ring. The secondary seal device may be configured to substantially seal an annular gap between the secondary seal carrier ring and the annular array of the seal shoes. The seal base may be engaged axially with and between the secondary seal carrier ring and the support ring.

The assembly may include a second support ring nested radially within the carrier base. The secondary seal device may be mounted axially between the secondary seal device and the second support ring.

The assembly may include a static structure, a rotor structure and a seal assembly configured to substantially seal an annular gap between the static structure and the rotor structure. The seal assembly may include the carrier base, the support ring, the seal base, the spring elements and the seal shoes. The seal shoes may circumscribe and sealingly engage the rotor structure. The carrier base may be mounted to and radially within the static structure.

The static structure may be configured as or otherwise include a turbine engine static structure. The rotor structure may be configured as or otherwise include a turbine engine shaft.

The assembly may include a hydrostatic non-contact seal device which includes the seal base, the spring elements and the seal shoes.

The assembly may include a support ring including a surface that axially engages the seal base. A ring aperture may extend axially through the support ring. The ring aperture may be coaxial with a first of the threaded base apertures. A second of the threaded base apertures may be closed off by the surface.

The foregoing features and the operation of the invention will become more apparent in light of the following description and the accompanying drawings.

DETAILED DESCRIPTION OF THE INVENTION

Figure 1:
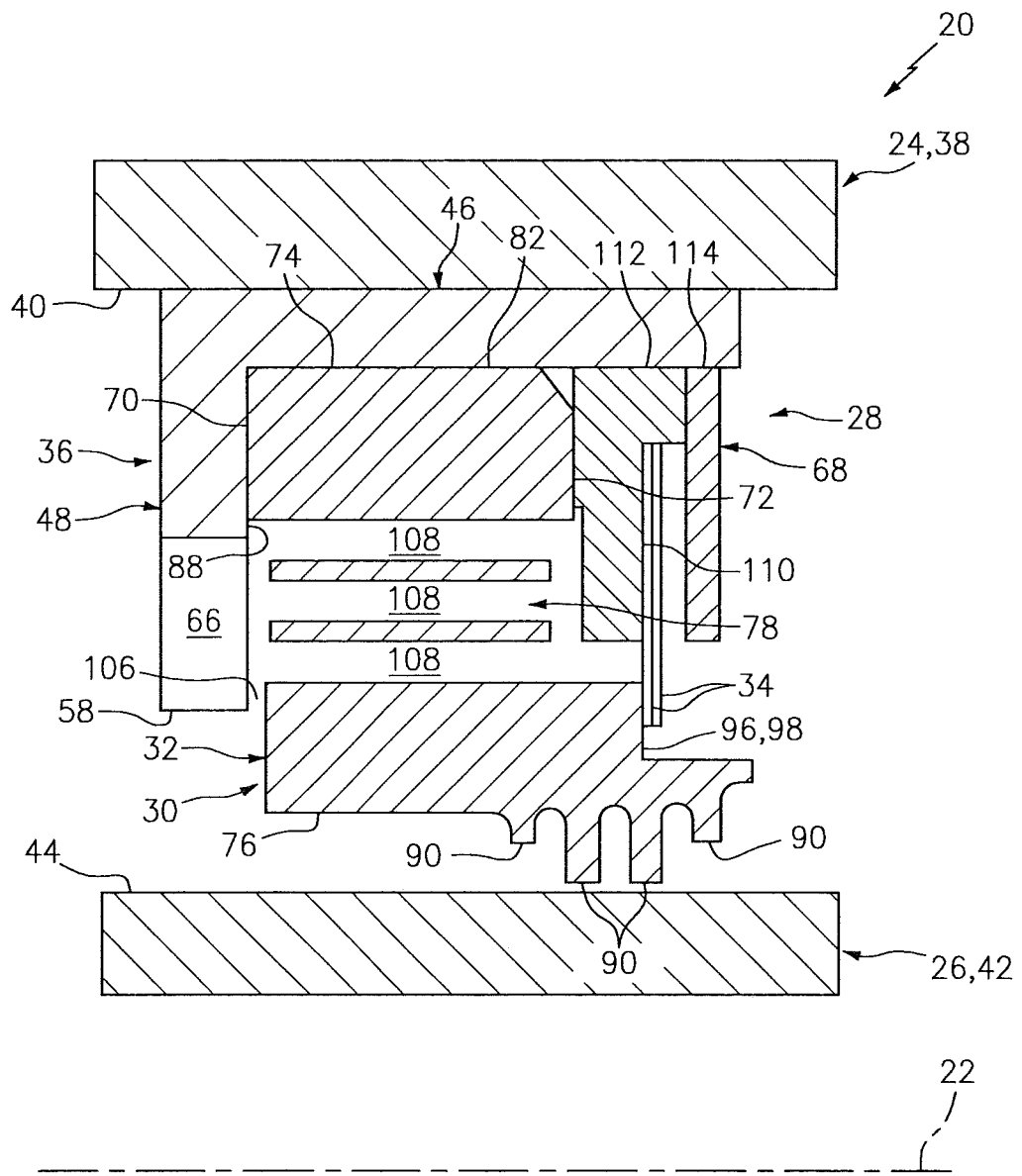
FIG. 1 is a top-half side sectional illustration of an assembly for rotational equipment at a first circumferential position.
Figure 2:
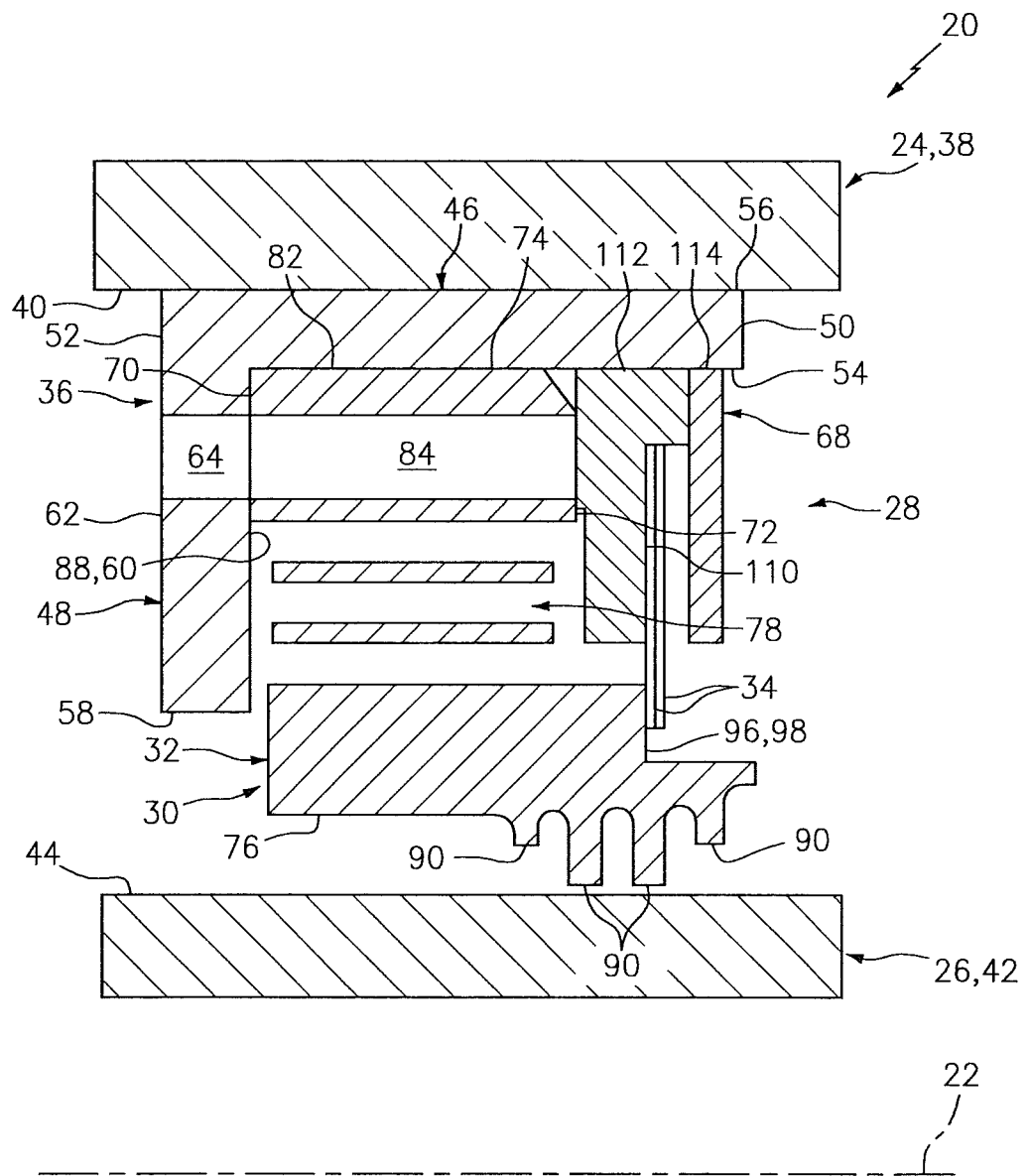
FIG. 2 is another top-half side sectional illustration of the assembly at a second circumferential position.
Figure 3:
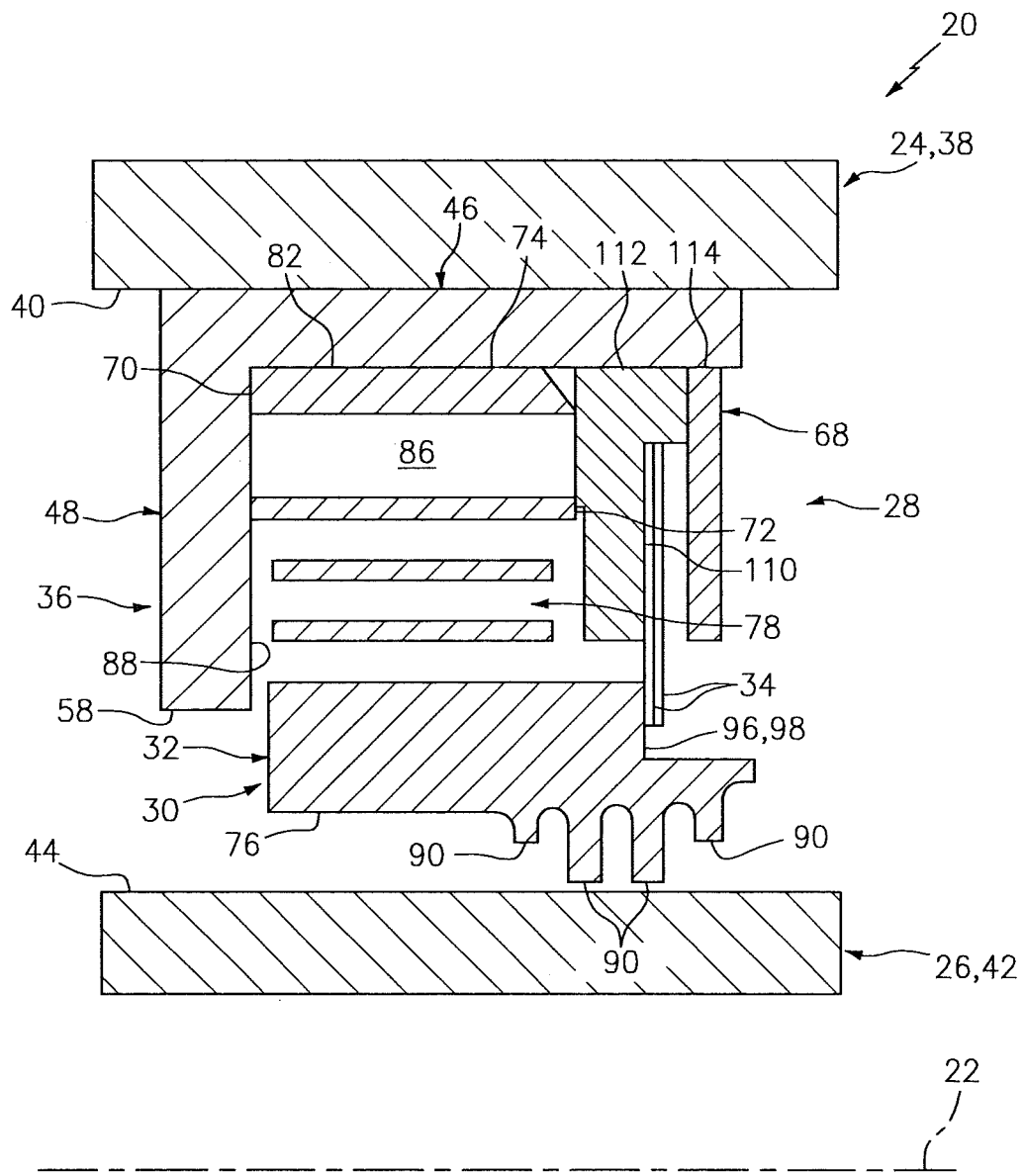
FIG. 3 is another top-half side sectional illustration of the assembly at a third circumferential position.

FIGS. 1-3 illustrate an assembly 20 for rotational equipment with an axial centerline 22. An example of such rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine or any other apparatus in which a seal is provided between a static structure and a rotor structure.

The assembly 20 of FIGS. 1-3 includes a static structure 24, a rotor structure 26, a seal support assembly 28 and a seal assembly 30. The seal assembly 30 is fixedly mounted with the static structure 24 through the support assembly 28, e.g., via radially interfering snap fits. The seal assembly 30 includes a primary seal device 32 and one or more secondary seal devices 34, which seal devices 32 and 34 are configured to substantially seal an annular gap between the static structure 24/a carrier structure 36 and the rotor structure 26 as described below in further detail.

The static structure 24 includes a static mount 38. This static mount 38 may be a discrete, unitary annular body. Alternatively, the static mount 38 may be configured with another component/portion of the static structure 24. The static mount 38 has an inner radial mount surface 40. This mount surface 40 may be substantially cylindrical, and extends circumferentially around and faces towards the axial centerline 22. The mount surface 40 at least partially forms a bore in the static structure 24. This bore is sized to receive the seal support assembly 28, at least one component (e.g., 36) of which may be fixedly attached to the static mount 38 by, for example, a press fit connection between each component and the mount surface 40. Of course, the present disclosure is not limited to such an exemplary mounting scheme between the seal support assembly 28 components and the static mount 38.

The rotor structure 26 includes a seal land 42. This seal land 42 may be a discrete, unitary annular body. Alternatively, the seal land 42 may be configured with another component/portion of the rotor structure 26. The seal land 42 has an outer radial seal land surface 44. This seal land surface 44 may be substantially cylindrical, and extends circumferentially around and faces away from the axial centerline 22. The seal land surface 44 is disposed to face towards and is axially aligned with the mount surface 40. While FIGS. 1-3 illustrate the surfaces 40 and 44 with approximately equal axial lengths along the axial centerline 22, the seal land surface 44 may alternatively be longer or shorter than the mount surface 40 in other embodiments.

The seal support assembly 28 of FIGS. 1-3 includes the carrier structure 36, which includes a (e.g., tubular) carrier base 46 and a (e.g., annular) support ring 48. The carrier structure 36 may be configured as a monolithic carrier structure. Herein, the term "monolithic" may describe a component which is formed as a single unitary body. The carrier base 46, for example, may be cast, machined, additively manufactured and/or otherwise formed integral with the support ring 48 as a unitary body. This monolithic carrier structure 36 of FIGS. 1-3 has a full hoop body (see also FIG. 4), which is formed without any mechanically interconnected axial and/or circumferential segments. The present disclosure, however, is not limited to the foregoing exemplary carrier structure 36 configuration. For example, in other embodiments, the carrier base 46 and the support ring 48 may be formed as discrete structures. In such embodiments, the support ring 48 may be nested radially within and mounted to the carrier base 46.

Referring again to the carrier structure 36 of FIG. 2, the carrier base 46 extends axially along the centerline 22 between a carrier first end 50 and a carrier second end 52. The carrier base 46 extends radially between a carrier inner surface 54 and a carrier outer surface 56, which is configured to radially engage the mount surface 40.

The support ring 48 is located at (e.g., on, adjacent or proximate) the carrier second end 52. The support ring 48 projects radially inward from the carrier base 46 and, more particularly, the inner surface 54 to a radial inner distal end 58. The support ring 48 extends axially along the centerline 22 between a ring first side 60 and a ring second side 62, which may be axially aligned with the carrier second end 52.

Figure 4:
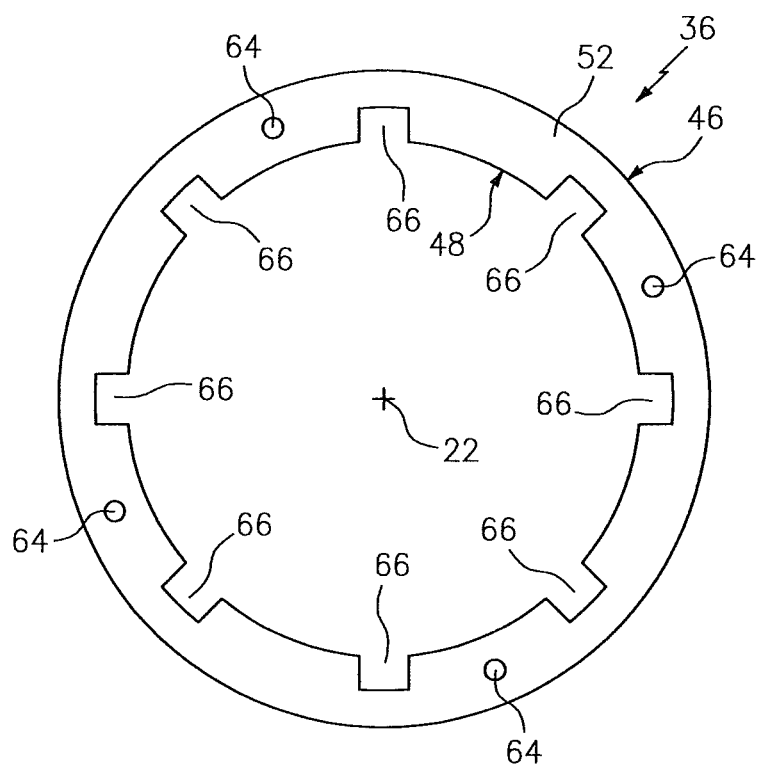
FIG. 4 is an end-view illustration of a carrier structure.

Referring to FIGS. 2 and 4, the support ring 48 is configured with one or more ring apertures 64. These ring apertures 64 are arranged about the centerline 22 in an annular array (see FIG. 4). Each of these ring apertures 64 extends through the support ring 48 between the ring first side 60 and the ring second 62. Each of the ring apertures 64 may be a threaded ring aperture (e.g., a tapped bolt hole), and configured to receive a threaded shaft of a tool as described below in further detail.

The support ring 48 may be configured as a scalloped support ring as shown in FIGS. 1 and 4. For example, the support ring 48 of FIGS. 1 and 4 is configured with a plurality of apertures 66 (e.g., scallops), which are arranged in an annular array about the centerline 22. Each of these apertures 66 extends axially through the support ring 48 between the ring first side 60 and the ring second 62. Each of the apertures 66 extends, in a radial outward direction, partially into the support ring 48 from the radial inner distal end 58.

Referring to FIG. 1, the seal support assembly 28 also includes a secondary support structure 68, the configuration of which is described below in further detail. The seal support assembly 28 components are configured together to position, support and/or mount the seal devices 32 and 34 of the seal assembly 30 with the static structure 24. The carrier base 46 of FIG. 1, for example, is configured as a carrier for the assembly components 32, 34 and 68. This enables the components 32, 34, 36 and 68 to be mated with the static structure 24 as a modular unit/cartridge. The support ring 48 of FIG. 1 is configured for axially positioning and/or supporting a second end surface 70 of the primary seal device 32 relative to the static structure 24. The secondary support structure 68 of FIG. 1 is configured for positioning, supporting and/or mounting the secondary seal devices 34 relative to the primary seal device 32. This secondary support structure 68 is also configured for axially positioning and/or supporting a first end surface 72 of the primary seal device 32 relative to the static structure 24.

Figure 5:
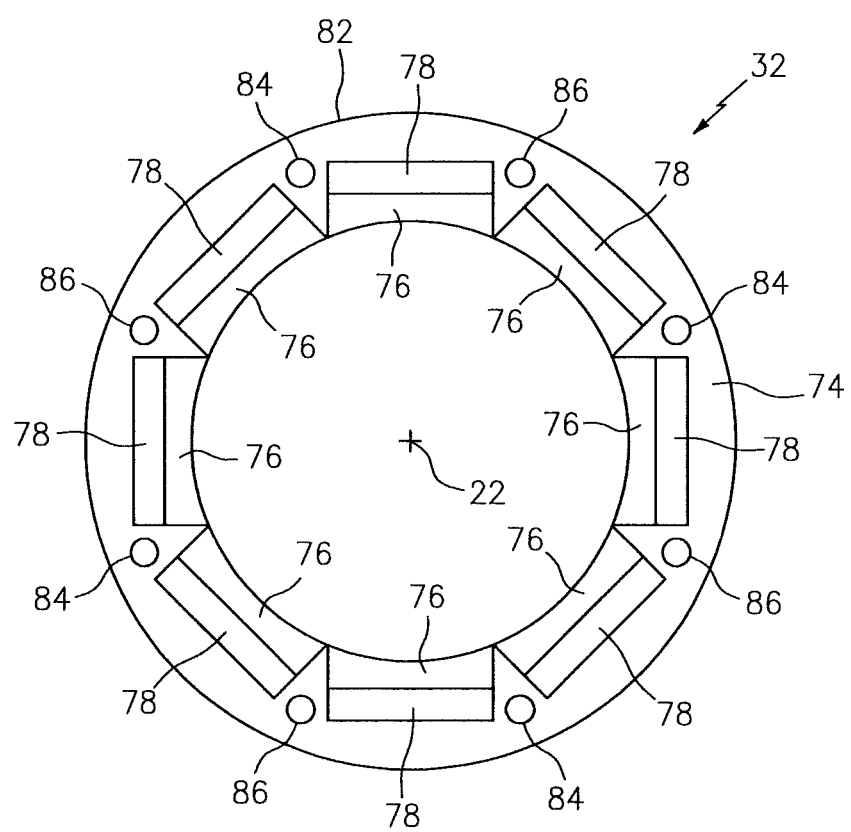
FIG. 5 is an end-view schematic block illustration of a primary seal device.

FIG. 5 illustrates the primary seal device 32 in schematic block form. This primary seal device 32 is configured as an annular non-contact seal device and, more particularly, a hydrostatic non-contact seal device. An example of such a hydrostatic non-contact seal device is a "HALO™" seal; however, the primary seal device 32 of the present disclosure is not limited to the foregoing exemplary hydrostatic non-contact seal device.

Figure 6:
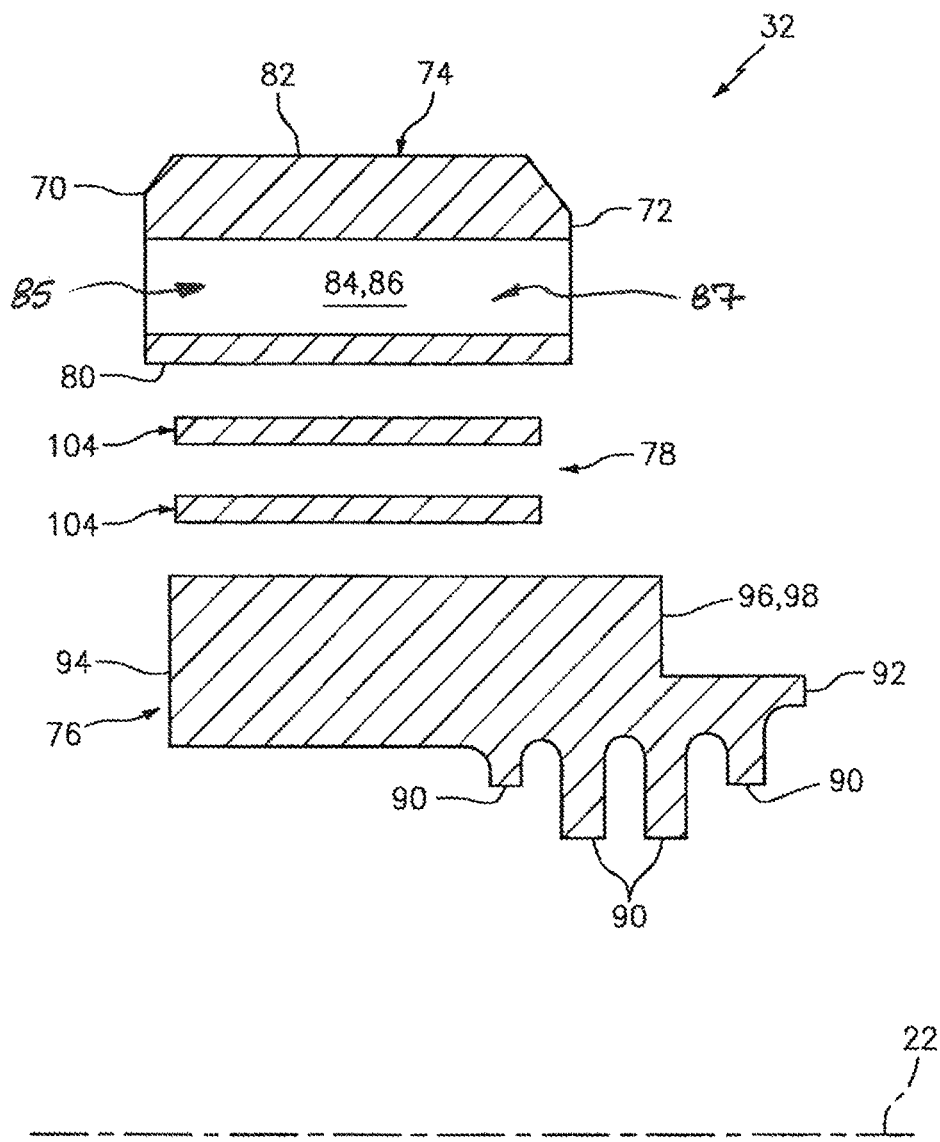
FIG. 6 is a top-half side sectional illustration of the primary seal device.
Figure 7:
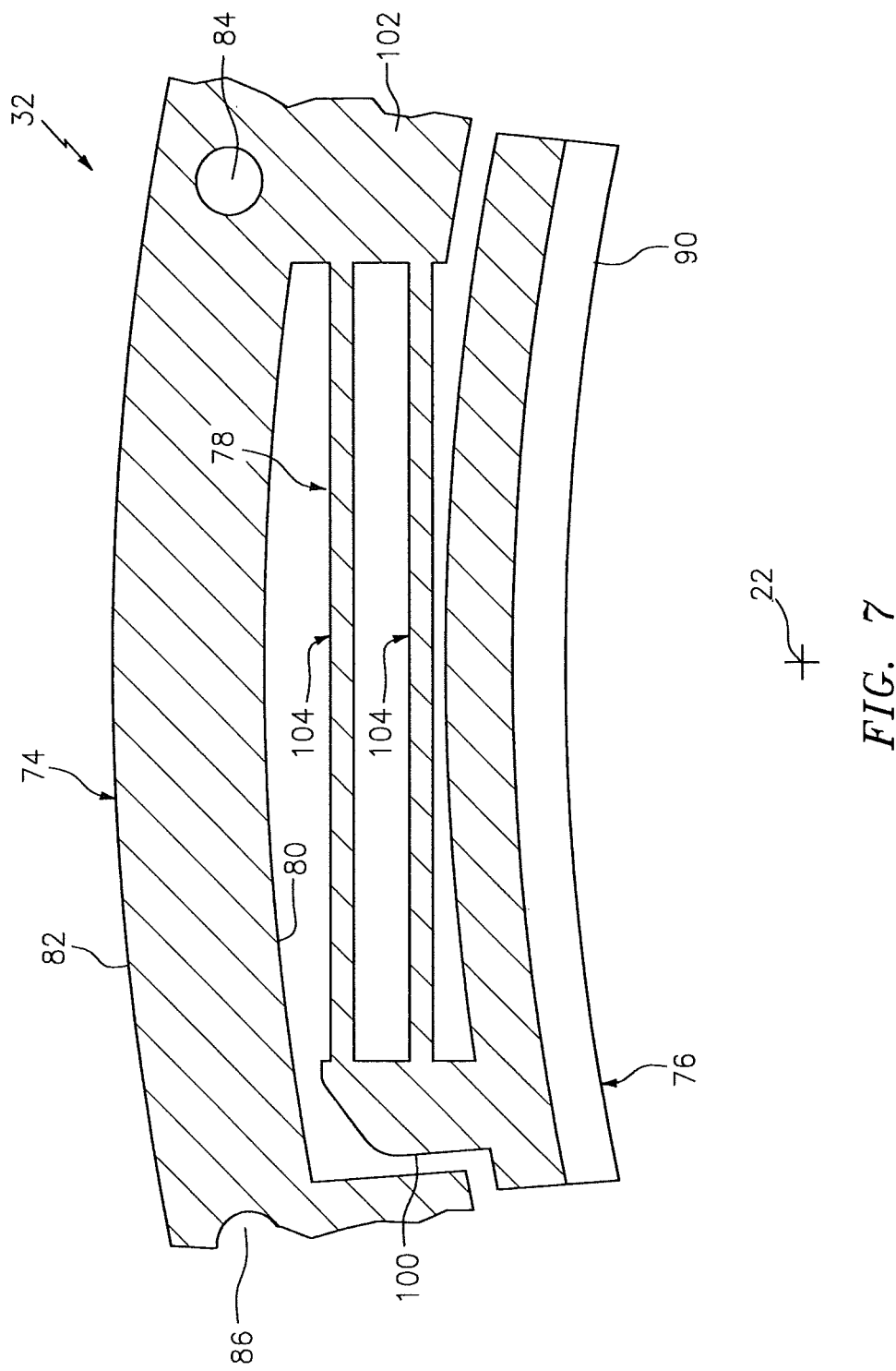
FIG. 7 is a cross-sectional illustration of a portion of the primary seal device.

Referring to FIGS. 5-7, the primary seal device 32 includes a seal base 74, a plurality of seal shoes 76 and a plurality of spring elements 78. The seal base 74 is configured as an annular full hoop body (see FIG. 5), which extends circumferentially around the axial centerline 22. The seal base 74 is configured to circumscribe the seal shoes 76 as well as the spring elements 78. The seal base 74 extends axially along the axial centerline 22 between and forms the second end surface 70 and the first end surface 72. The seal base 74 extends radially between an inner radial base side 80 and an outer radial base side 82, which radially engages (e.g., is press fit against) the carrier base 46 and, more particularly, the inner surface 54 (see FIG. 2).

Referring to FIG. 5, the carrier base 46 is configured with one or more base apertures 84 and 86. These base apertures 84 and 86 are arranged about the centerline 22 in an annular array. The base apertures include a set of one or more first base apertures 84 and a set of one or more second base apertures 86. Referring to FIG. 6, each of the base apertures 84, 86 extends through the seal base 74 between the first end surface 72 and the second end surface 70. Each of the base apertures 84, 86, for example, has an axial first portion 85 and an axial second portion 87. The first portion 85 extends axially along the centerline 22 into the seal base 74 in a first axial direction from an axial first end (at surface 70) of the seal base 74. The second portion 87 extends axially along the centerline 22 into the seal base 74 in a second axial direction from an axial second end (at surface 72) of the seal base 74, where the second axial direction is opposite the first axial direction. Each of the base apertures 84, 86 may be a threaded base aperture (e.g., a tapped bolt hole such as a threaded through-hole), and configured to receive a threaded shaft of a tool as described below in further detail. Each of the base apertures 84 and 86 may have the same diameter, which may be the same as the diameters of the ring apertures 64; however, the present disclosure is not limited to such an exemplary embodiment.

Referring now to FIGS. 2, 4 and 5, the first base apertures 84 are located within the base aperture array such that each of the first base apertures 84 is circumferentially and radially aligned with and, thereby, coaxial with a respective one of the ring apertures 64. In contrast, Referring to FIGS. 3-5, the second base apertures 86 are located within the base aperture array such that each of the second base apertures 86 is misaligned from the ring apertures 64. In this manner, an end of each of the second base apertures 86 is closed off (e.g., covered and overlapped) by a surface 88 at the side 60 of the support ring 48 which axially engages (e.g., contacts) the carrier base 46 and its second end surface 70. In the specific embodiment of FIG. 5, the second base apertures 86 are inter-disposed with the first base apertures 84 such that, for example, a single one of the second base apertures 86 is positioned circumferentially between a respective adjacent pair of the first base apertures 84. Furthermore, with the foregoing configuration, a number of the first base apertures 84 is equal to a number of the ring apertures 64, and a total number of the first base apertures 84 and the second base apertures 86 is greater than the number of the ring apertures 64.

Referring to FIGS. 1, 5 and 7, the seal shoes 76 are configured as arcuate bodies arranged circumferentially about the axial centerline 22 in an annular array. This annular array of the seal shoes 76 extends circumferentially around the axial centerline 22, thereby forming an inner bore at an inner radial side of the primary seal device 32. This inner bore is sized to receive the seal land 42 (see FIG. 1), where the rotor structure 26 projects axially through (or into) the inner bore formed by the seal shoes 76.

Referring to FIGS. 1 and 6, each of the seal shoes 76 includes one or more arcuate protrusions, which collectively form one or more (e.g., a plurality of axially spaced) generally annular (e.g., circumferentially segmented) ribs 90 at the inner radial side of the shoes 76. Distal inner radial ends of one or more of these ribs 90 are configured to be arranged in close proximity with (but not touch) and thereby sealingly engage the seal land surface 44 in a non-contact manner, where the rotor structure 26 projects axially through (or into) the inner bore formed by the seal shoes 76. The ribs 90 therefore are configured, generally speaking, as non-contact knife edge seal elements.

Referring to FIG. 6, each of the seal shoes 76 extends axially along the axial centerline 22 between a first shoe end 92 and a second shoe end 94. The first shoe end 92 may be axially offset from and project axially away from the first end surface 72. The second shoe end 94 may be axially offset from and recessed axially from the second end surface 70.

Each of the seal shoes 76 includes an arcuate end surface 96 generally at (e.g., on, adjacent or proximate) the first shoe end 92. In the array (see FIG. 5), these arcuate end surfaces 96 collectively form a generally annular (but circumferentially segmented) end surface 98 configured for sealingly engaging with the secondary seal devices 34 (see FIG. 1) as described below in further detail. The seal shoes 76 of the present disclosure, however, are not limited to the foregoing exemplary configuration.

Referring to FIGS. 5-7, the spring elements 78 are arranged circumferentially about the axial centerline 22 in an annular array. The spring elements 78 are also arranged radially between the seal shoes 76 and the seal base 74. Each of the spring elements 78 is configured to connect a respective one of the seal shoes 76 with the seal base 74. The spring element 78 shown in FIG. 7, for example, includes one or more mounts 100 and 102 (e.g., generally radial fingers/projections) and one or more springs 104 (e.g., cantilever-leaf springs). The first mount 100 is connected to a respective one of the seal shoes 76 at (e.g., on, adjacent or proximate) its first circumferential side, where an opposing second circumferential side of that seal shoe 76 is free floating. The second mount 102 is connected to the seal base 74, and is generally circumferentially aligned with or near the second circumferential side. The springs 104 are radially stacked and spaced apart with one another. Each of these springs 104 extends laterally (e.g., tangentially or circumferentially) from the first mount 100 to the second mount 102. These spring elements 78 may thereby laterally overlap a major circumferential portion (e.g., ~50-90%) of the seal shoe 76. The spring elements 78 of the present disclosure, however, are not limited to the foregoing exemplary configuration or values.

During operation of the primary seal device 32, aerodynamic forces may develop and apply a fluid pressure to each of the seal shoes 76 causing the respective seal shoe 76 to move radially relative to the seal land surface 44. The fluid velocity may increase as a gap between the seal shoe 76 and seal land surface 44 increases, thus reducing pressure in the gap and drawing the seal shoe 76 radially inwardly toward the seal land surface 44. As the gap closes, the velocity may decrease and the pressure may increase within the gap, thus, forcing the seal shoe 76 radially outwardly from the seal land surface 44. The respective spring element may deflect and move with the seal shoe 76 to create a primary seal of the gap between the seal land surface 44 and ribs 90 within predetermined design tolerances.

Under certain conditions, one or more of the seal shoes 76 may also move axially relative to the carrier base 46. In particular, a pressure differential across the seal assembly 30 may cause the seal shoes 76 to move axially in a direction (e.g., towards left-hand-side of FIG. 1) towards the support ring 48. To limit this axial movement, the support ring 48 projects radially inwards to radially overlap the seal shoes 76 and is also located axially near the seal shoes 76. In this manner, when one or more of the seal shoes 76 move axially, the shoe(s) axially engage the support ring 48 and prevent further axial displacement of the shoe(s). However, where the seal shoes 76 are in their nominal position (see FIG. 1), a slight axial gap 106 extends between and separates the seal shoes 76 from the support ring 48.

While the primary seal device 32 is operable to generally seal the annular gap between the static structure 24/carrier structure 36 and the rotor structure 26 as described above, fluid (e.g., gas) may still flow axially through passages 108 defined by radial gaps between the components 74, 76 and 78 (see FIG. 1). The secondary seal devices 34 therefore are provided to seal off these passages 108 and, thereby, further and more completely seal the annular gap.

Each of the secondary seal devices 34 may be configured as a ring seal element such as, but not limited to, a split ring. Alternatively, one or more of the secondary seal devices 34 may be configured as a full hoop body ring, an annular brush seal or any other suitable ring-type seal.

The secondary seal devices 34 of FIG. 1 are arranged together in an axial stack. In this stack, each of the secondary seal devices 34 axially engages (e.g., contacts) another adjacent one of the secondary seal devices 34. The stack of the secondary seal devices 34 is arranged with the secondary support structure 68, which positions and mounts the secondary seal devices 34 with the carrier structure 36 axially adjacent the primary seal device 32. In this arrangement, the stack of the secondary seal devices 34 is operable to axially engage and form a seal between the end surface 98 of the array of the seal shoes 76 and an annular surface 110 of the secondary support structure 68. These surfaces 98 and 110 are axially aligned with one another, which enables the stack of the secondary seal devices 34 to slide radially against, but maintain sealingly engagement with, the end surface 98 as the seal shoes 76 move radially relative to the seal land surface 44 as described above.

The secondary support structure 68 may include a secondary seal carrier ring 112 and a secondary support ring 114 (e.g., retention ring), which are nested radially within and radially engaged with the carrier structure 36. The secondary seal carrier ring 112 is configured with an annular full hoop body, which extends circumferentially around the axially centerline 22. The secondary seal carrier ring 112 includes the annular surface 110, and is disposed axially adjacent and engaged with the seal base 74.

The support ring 114 is configured with an annular full hoop body, which extends circumferentially around the axially centerline 22. The support ring 114 is disposed axially adjacent and engaged with the secondary seal carrier ring 112, thereby capturing the stack of the secondary seal devices 34 within an annular channel formed between the rings 112 and 114. The stack of the secondary seal devices 34, of course, may also or alternatively be attached to one of the rings 112 and 114 by, for example, a press fit connection and/or otherwise.

Figure 8:
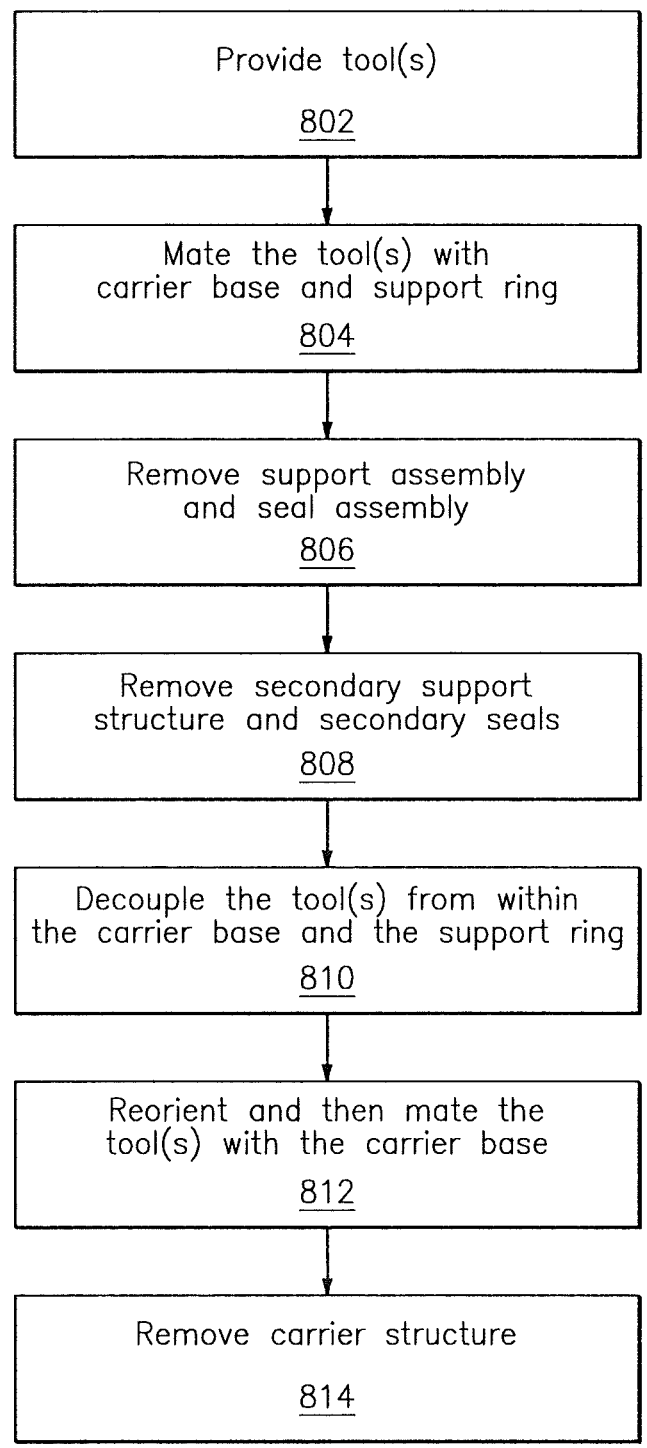
FIG. 8 is a flow diagram of a method involving a rotational equipment assembly such as the assembly of FIGS. 1-3.

FIG. 8 is a flow diagram of a method 800 involving a rotational equipment assembly such as the assembly 20 described above. During this method, the support assembly 28 and the seal assembly 30 are removed from the piece of rotational equipment. One or more components 32, 34, 36 and 68 of the assemblies are also disassembled, which may enable inspection and/or repair of one or more assembly components 32, 34, 36 and 68. The various parts may be held together by radially interfering snap fits, which must be overcome during the disassembly process.

Figure 9:
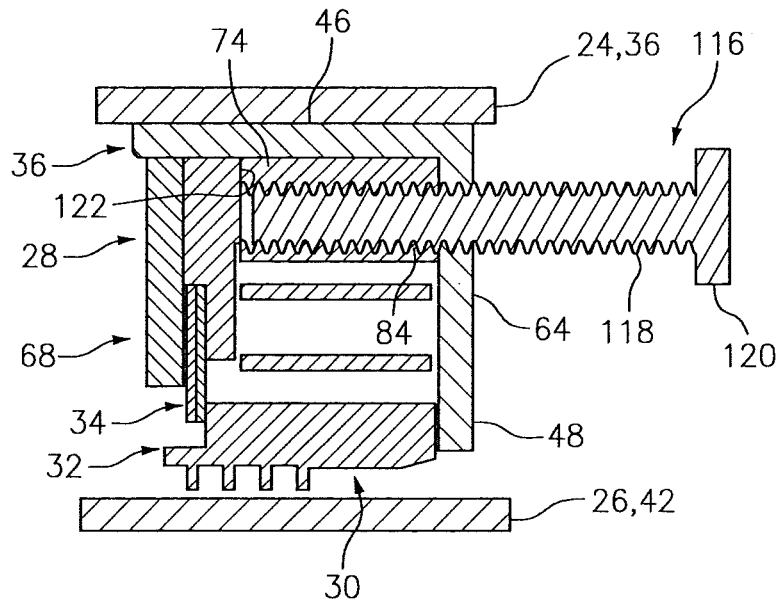
FIGS. 9-13 are top-half side sectional illustrations of the assembly during a disassembly sequence.

In step 802, one or more tools 116 are provided. Referring to FIG. 9, each of these tools 116 includes a threaded shaft 118, which may be completely threaded or partially threaded with an unthreaded shank for example. Each of the tools 116 may also include a tool base 120, where the threaded shaft 118 projects out from the tool base 120. In the specific embodiment of FIG. 9, each tool is configured as a threaded bolt, where the tool base 120 is a head of the bolt. However, the present disclosure is not limited to such a tool configuration. For example, in other embodiments, the tool base 120 may be configured as a handle or otherwise with threads that engage tapped hole 84 and/or 86.

In step 804, the one or more tools 116 are mated with the carrier base 46 and the support ring 48. For example, as shown in FIG. 9, the threaded shaft 118 of each tool may be threaded into a respective one of the ring apertures 64 and a respective one of the first base apertures 84.

Figure 10:
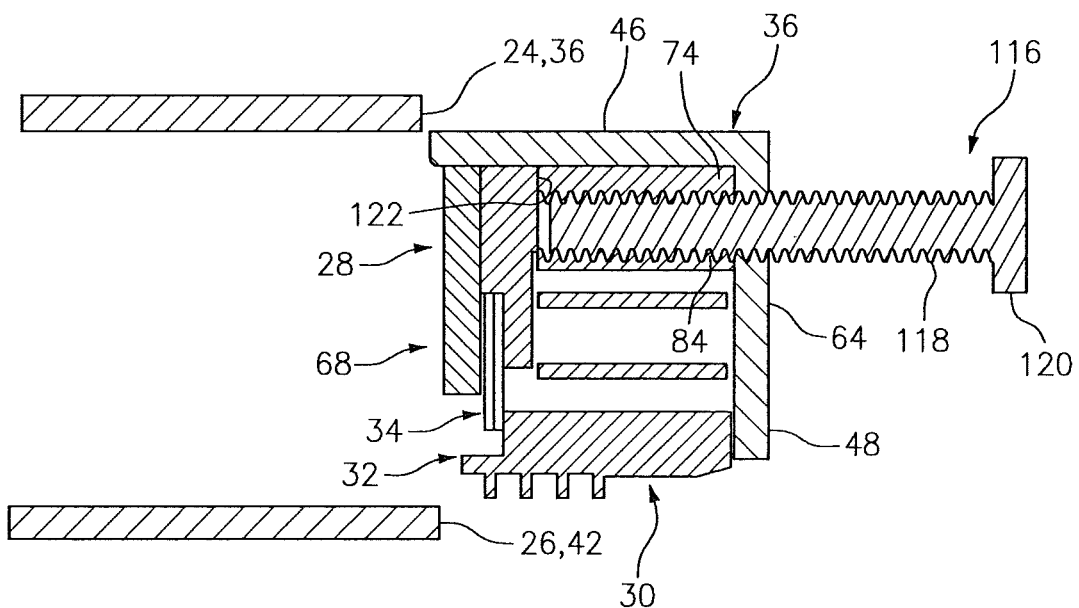

In step 806, the support assembly 28 and the seal assembly 30 are removed from the piece of rotational equipment as a single unit; e.g., a cartridge. For example, as shown in FIGS. 9 to 10, the tools 116 and, more particularly, the tool bases 120 are pulled axially (e.g., towards the right-hand-side of FIGS. 9 and 10). In general, an equal axial pulling force should be applied to each of the tools 116 in order to prevent skewing of the assemblies during the removal process. In this manner, the support assembly 28 and the seal assembly 30 are disconnected from the static structure 24 and unmated from the rotor structure 26.

Figure 11:
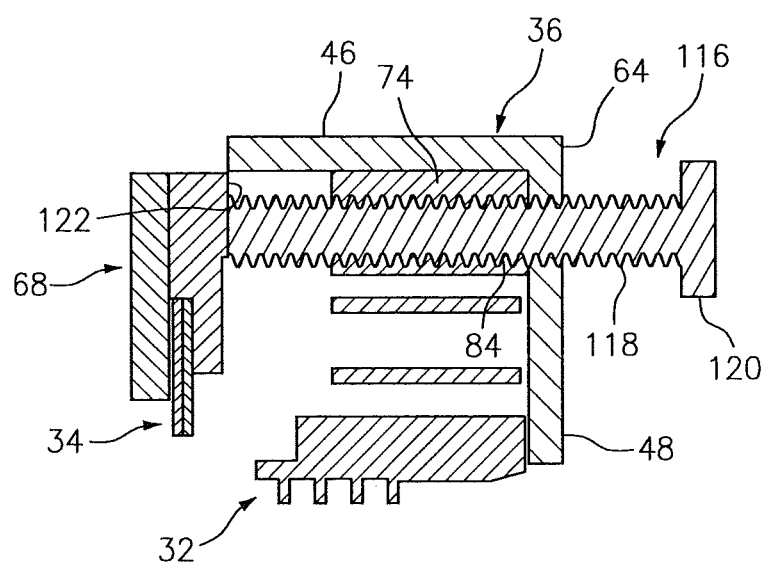

In step 808, the secondary support structure 68 and the secondary seal devices 34 are removed from the assemblies. For example, as shown in FIG. 11, the tools 116 are rotated such that each tool 116 and its threaded shaft 118 applies a generally equal axial force against the surface 122 of the secondary support structure 68. The application of these axial forces cause the secondary support structure 68 and the secondary seal devices 34 to be pushed out of and thereby decoupled from the carrier base 46.

Figure 12:
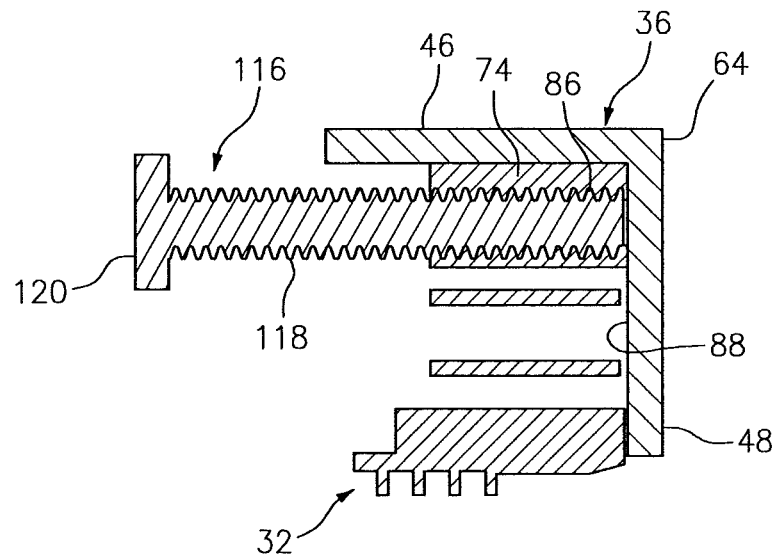

In step 810, the tools 116 are decoupled from the apertures 64 and 84. Then, in step 812, the tools 116 are reoriented and mated with the seal base 74. For example, as shown in FIG. 12, the threaded shaft 118 of each tool may be threaded into a respective one of the second base apertures 86.

Figure 13:
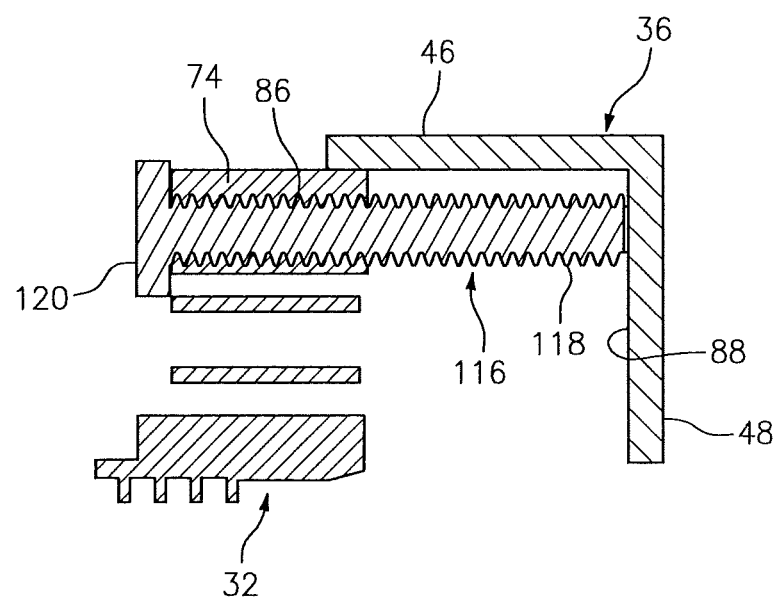

In step 812, the primary seal device 32 is removed from the carrier structure 36. For example, as shown in FIGS. 12 to 13, the tools 116 are rotated such that each tool 116 and its threaded shaft 118 applies a generally equal axial force against the surface 88 of the support ring 48. The application of these axial forces cause the seal base 74 to be pulled out of and thereby decoupled from the carrier structure 36.

The present disclosure is not limited to the exemplary primary seal device 32 type or configuration described above. Various other non-contact seals are known in the art and may be reconfigured in light of the disclosure above to be included with the assembly 20 of the present disclosure. Other examples of non-contact seals are disclosed in U.S. Pat. Nos. 8,172,232; 8,002,285; 7,896,352; 7,410,173; 7,182,345; and 6,428,009, each of which is hereby incorporated herein by reference in its entirety.

Figure 14:
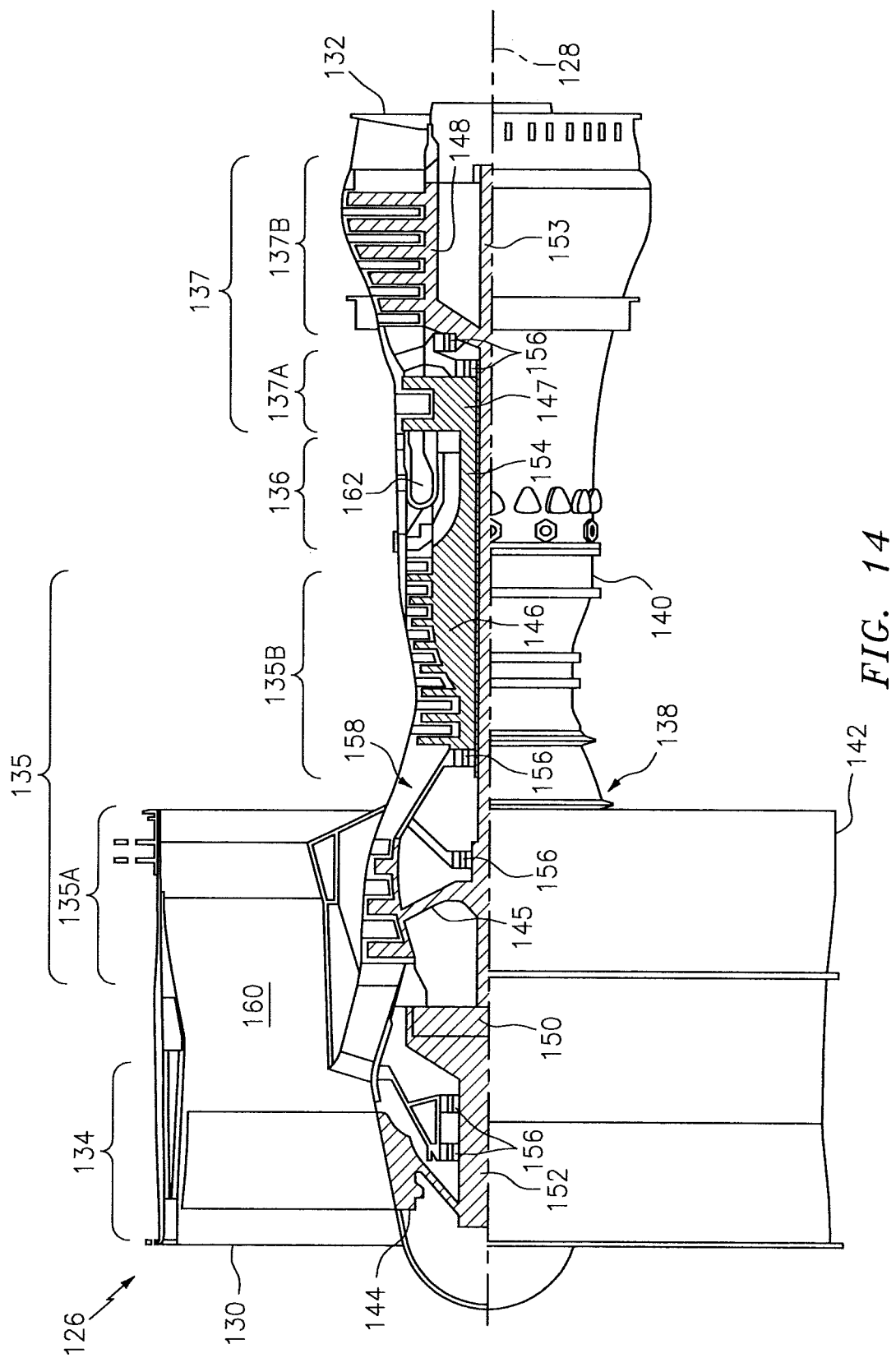
FIG. 14 is a side cutaway illustration of a gas turbine engine.

As described above, the assembly 20 of the present disclosure may be configured with various different types and configurations of rotational equipment. FIG. 14 illustrates one such type and configuration of the rotational equipment—a geared turbofan gas turbine engine 126. Such a turbine engine includes various static structures (e.g., bearing supports, hubs, cases, etc.) as well as various rotor structures (e.g., rotor disks, shafts, etc.) as described below, where the static structure 24 and the rotor structure 26 can respectively be configured as anyone of the foregoing structures in the turbine engine 126 of FIG. 14, or other structures not mentioned herein.

Referring still to FIG. 14, the turbine engine 126 extends along an axial centerline 128 (e.g., the centerline 22) between an upstream airflow inlet 130 and a downstream airflow exhaust 132. The turbine engine 126 includes a fan section 134, a compressor section 135, a combustor section 136 and a turbine section 137. The compressor section 135 includes a low pressure compressor (LPC) section 135A and a high pressure compressor (HPC) section 135B. The turbine section 137 includes a high pressure turbine (HPT) section 137A and a low pressure turbine (LPT) section 137B.

The engine sections 134-137 are arranged sequentially along the centerline 128 within an engine housing 138, a portion or component of which may include or be connected to the static structure 24. This housing 138 includes an inner case 140 (e.g., a core case) and an outer case 142 (e.g., a fan case). The inner case 140 may house one or more of the engine sections 135-137; e.g., an engine core. The outer case 142 may house at least the fan section 134.

Each of the engine sections 134, 135A, 135B, 137A and 137B includes a respective rotor 144-148. Each of these rotors 144-148 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 144 is connected to a gear train 150, for example, through a fan shaft 152. The gear train 150 and the LPC rotor 145 are connected to and driven by the LPT rotor 148 through a low speed shaft 153. The HPC rotor 146 is connected to and driven by the HPT rotor 147 through a high speed shaft 154. The shafts 152-154 are rotatably supported by a plurality of bearings 156; e.g., rolling element and/or thrust bearings. Each of these bearings 156 is connected to the engine housing 138 by at least one stationary structure such as, for example, an annular support strut.

During operation, air enters the turbine engine 126 through the airflow inlet 130. This air is directed through the fan section 134 and into a core gas path 158 and a bypass gas path 160. The core gas path 158 flows sequentially through the engine sections 135A, 135B, 136, 137A and 137B. The bypass gas path 160 flows away from the fan section 134 through a bypass duct, which circumscribes and bypasses the engine core. The air within the core gas path 158 may be referred to as "core air". The air within the bypass gas path 160 may be referred to as "bypass air".

The core air is compressed by the compressor rotors 145 and 146 and directed into a combustion chamber 162 of a combustor in the combustor section 136. Fuel is injected into the combustion chamber 162 and mixed with the compressed core air to provide a fuel-air mixture. This fuel air mixture is ignited and combustion products thereof flow through and sequentially cause the turbine rotors 147 and 148 to rotate. The rotation of the turbine rotors 147 and 148 respectively drive rotation of the compressor rotors 146 and 145 and, thus, compression of the air received from a core airflow inlet. The rotation of the turbine rotor 148 also drives rotation of the fan rotor 144, which propels bypass air through and out of the bypass gas path 160. The propulsion of the bypass air may account for a majority of thrust generated by the turbine engine 126, e.g., more than seventy-five percent (75%) of engine thrust. The turbine engine 126 of the present disclosure, however, is not limited to the foregoing exemplary thrust ratio.

The assembly 20 may be included in various aircraft and industrial turbine engines other than the one described above as well as in other types of rotational equipment; e.g., wind turbines, water turbines, rotary engines, etc. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 14), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly with an axial centerline for rotational equipment, the assembly comprising:
   a plurality of seal shoes arranged about the centerline in an annular array;
   a seal base circumscribing the annular array of the seal shoes, wherein a threaded base aperture extends axially along the axial centerline through the seal base;
   a plurality of spring elements, each of the spring elements radially between and connecting a respective one of the seal shoes with the seal base; and
   a support ring including a surface that axially engages the seal base, wherein a ring aperture extends axially along the centerline through the support ring, and the ring aperture is aligned with the threaded base aperture;
   wherein the spring elements are formed integral with the seal base and the seal shoes as a unitary body;
   wherein the threaded base aperture is not mated with a threaded bolt during operation of the rotational equipment.

2. The assembly of claim 1, wherein
   the threaded base aperture is one of a plurality of threaded base apertures arranged about the centerline in an annular array; and
   each of the threaded base apertures extends axially through the seal base.

3. The assembly of claim 2, wherein a second of the threaded base apertures is closed off by the surface.

4. The assembly of claim 3, wherein the ring aperture comprises a threaded ring aperture.

5. The assembly of claim 2, wherein
   the ring aperture is one of a plurality of ring apertures that are arranged about the centerline in an annular array, and each of the ring apertures extends axially through the support ring and is aligned with a respective one of the threaded base apertures; and
   a number of the threaded base apertures is greater than a number of the ring apertures.

6. The assembly of claim 5, wherein the each of the ring apertures comprises a threaded ring aperture.

7. The assembly of claim 1, wherein the ring aperture comprises a threaded ring aperture.

8. The assembly of claim 1, further comprising:
   a carrier base extending axially along and circumferentially around the centerline;
   wherein the seal base is nested radially within and radially engages the carrier base.

9. The assembly of claim 8, wherein the support ring is configured with the carrier base as a monolithic body.

10. The assembly of claim 8, further comprising:
    a carrier ring nested radially within the carrier base; and
    at least one ring seal element configured with the carrier ring;
    wherein the ring seal element is configured to cover an annular gap between the carrier ring and the annular array of the seal shoes; and
    wherein the seal base is engaged axially with and between the carrier ring and the support ring.

11. The assembly of claim 10, further comprising:
    a second support ring nested radially within the carrier base;
    wherein the ring seal element is mounted axially between the carrier ring and the second support ring.

12. The assembly of claim 8, further comprising:
    a static structure;
    a rotor structure; and
    a seal assembly configured to seal an annular gap between the static structure and the rotor structure, the seal assembly comprising the carrier base, the support ring, the seal base, the spring elements and the seal shoes;
    wherein the seal shoes circumscribe and sealingly engage the rotor structure; and
    wherein the carrier base is mounted to and radially within the static structure.

13. The assembly of claim 12, wherein the static structure comprises a turbine engine static structure, and the rotor structure comprises a turbine engine shaft.

14. The assembly of claim 1, further comprising a hydrostatic non-contact seal device that includes the seal base, the spring elements and the seal shoes.

15. The assembly of claim 1, wherein the support ring radially overlaps the spring elements.

16. The assembly of claim 1, wherein the support ring radially overlaps a portion of the seal shoes.

17. The assembly of claim 1, wherein
    the seal base extends axially along the axial centerline between a first end surface and a second end surface, and the seal base forms the first end surface and the second end surface; and
    the threaded base aperture extends axially along the axial centerline through the seal base from the first end surface to the second end surface.

18. The assembly of claim 1, wherein
    an axial first portion of the threaded base aperture extends axially along the axial centerline into the seal base in a first axial direction from an axial first end of the seal base; and
    an axial second portion of the threaded base aperture extends axially along the axial centerline into the seal base in a second axial direction from an axial second end of the seal base, where the second axial direction is opposite the first axial direction.

19. The assembly of claim 1, wherein the threaded base aperture is a threaded through-hole.

* * * * *